(No Model.)
W. GOLDTHWAIT.
WATCH REGULATOR.
No. 427,072. Patented May 6, 1890.
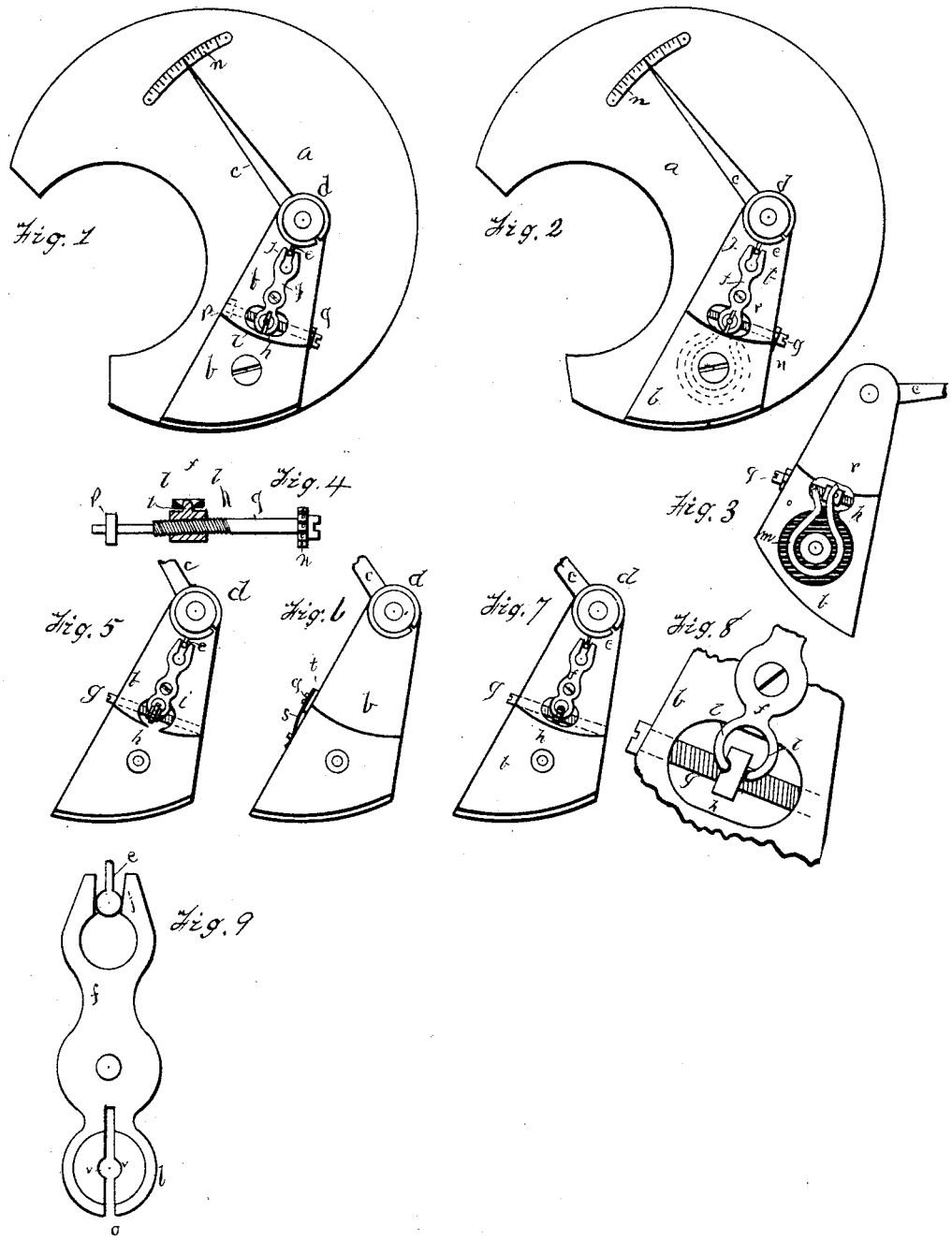
Witnesses
Geo. O. Smith
Frank W. Lee
Inventor
William Goldthwait
By his Attorney Allen Webster

UNITED STATES PATENT OFFICE.

WILLIAM GOLDTHWAIT, OF LONG MEADOW, MASSACHUSETTS.

WATCH-REGULATOR.

SPECIFICATION forming part of Letters Patent No. 427,072, dated May 6, 1890.

Application filed August 22, 1888. Serial No. 283,511. (No model.)

*To all whom it may concern:*

Be it known that I, WILLIAM GOLDTHWAIT, a citizen of the United States of America, residing at Long Meadow, in the county of Hampden and State of Massachusetts, have invented new and useful Improvements in Watch-Regulators, of which the following is a specification, reference being had to the accompanying drawings and letters of reference marked thereon.

My invention relates to that class of watch-regulators wherein a screw or threaded rod is relied upon to give the desired motion.

The object of my invention is to provide a watch-regulator which shall possess advantages over those now in use, and with which the hair-spring may be conveniently and accurately adjusted and the regulator rigidly held in the position to which it is moved.
My invention consists in the arrangement of a pivoted lever which engages the regulator-ring at one end and whose opposite end is moved through connection with a nut, or to which lever motion is imparted from a screw or threaded rod.

It also consists in the general construction and arrangement, as well as the detail as herein set out, whereby the objects of my invention are attained.

In the accompanying drawings, in which like letters of reference indicate like parts, Figure 1 is a view of a watch-plate having a balance-cock and regulator thereon. Fig. 2 is a like view showing a modification in the construction of my device. Fig. 3 is a view of a balance-cock inverted, further illustrating the construction shown in Fig. 2. Fig. 4 is an enlarged view of the adjusting-screw, the nut and end of lever being shown in section. Fig. 5 is a top view of a balance-cock having my device attached and showing the same construction in modified form. Figs. 6 and 7 are like views showing other modifications. Fig. 8 is a view of a part of Fig. 7 on an enlarged scale; and Fig. 9 is a view, on a larger scale, of the pivotal lever.

In detail, *a* indicates the plate; *b*, the balance-cock; *c*, the regulator-pointer; *d*, the regulator-ring; *e*, a stud or arm thereon; *f*, the pivoted lever; *g*, the adjusting screw or rod; *h*, a threaded nut thereon; *i*, a stud on said nut; *j* and *l*, spring-jaws on said lever; *m*, a spring to take up back motion, and *n* an index-plate.

The construction is as follows: To the face of the balance-cock I pivot a lever *f*, which lever is provided with spring-jaws *j* at one end, which engage a stud or arm *e* on the regulator-ring *d* in the manner shown in the drawings, and provided at the opposite end with a means to engage a nut, which nut traverses a screw or threaded rod *g*.

I prefer that the nut should be provided with a lug or pin *i*, and that a cut or slit *o* be made in the end of the lever *f* and recessed to receive the pin *i*. I prefer, also, that the end of this lever be counterbored or cut away upon its upper surface or otherwise beveled to an edge at the point where it comes in contact with the pin, in order to allow a slight rocking motion of the pin against this edge as the nut traverses the screw. The parts *l* spring slightly toward each other, and thus keep the inner faces of the parts *l* in contact with the pin *i* and prevent slack or lost motion.

I prefer that the screw *g* be smooth at each end and threaded in the central portion. The ends should fit snugly in suitable openings to receive them in the balance-cock, and a collar *p* on its end or point will prevent its moving backward, while its head prevents movement in the opposite direction. The pivotal point of the lever *f* is preferably located nearer the screw end rather than in its center, thus giving greater movement to the end which engages the regulator-ring.

In Figs. 2 and 3 I illustrate a means of taking up all possible lost motion in the bearings of the screw and traverse of the nut, doing away also with the necessity for the collar *p*. This I accomplish by the application of a spring *m*, which fits within a recess in the balance-cock, one end of which spring has bearing against the wall of this recess and the opposite end engages the nut and bears it in a direction away from the screw-head. The holding of the screw in position may also be accomplished by a spring *s*, (shown in Fig. 6,) which bears against a shoulder *t* upon the screw, and thus holds it in position.

It will be seen that the turning of the screw *g* will cause the nut to traverse the thread upon the screw and be thereby moved in the desired direction, carrying with it the end of the lever $f$, with which it has connection, and thereby moving its opposite end, and with it the regulator-ring and parts connected therewith, in the reverse direction, and greatly magnifying the movement of the pointer over the index-plate. The screw is preferably provided with an ordinary slotted head and also with an annular collar or part $u$, fixed to the screw and provided in its periphery with slots or openings to facilitate a delicate adjustment of it.

In Fig. 5 I illustrate a modification, wherein the screw is stationary and the nut is revolved upon it. In this the nut has an annular central ring which projects through the balance-cock and between the jaws $l$, which spring against it on either side, its periphery being notched to facilitate its revolution.

In the construction illustrated in Fig. 1 the revolution of the nut with the screw is prevented by the pin $i$ upon the nut resting within concave depressions in the inner face or edge of the jaws $l$. (Shown clearly in Fig. 9.) To accomplish this in another manner I cut a recess in one side of the nut, as illustrated in Figs. 7 and 8, and the spring-jaws $l$, engaging the nut at this point, effectually prevent its revolution with the screw, the jaws $l$ in this case being caliper-shaped.

Having therefore described my invention, what I claim, and desire to secure by Letters Patent, is—

1. The combination, in a watch-regulator, of a threaded rod or screw $g$, a nut to traverse the same, and a lever, as $f$, engaging an arm $e$ of the regulator-ring at one end and engaging the nut at the opposite end, and pivoted to the balance-cock at an intermediate point, substantially as shown.

2. The combination of a balance-cock having a threaded rod or screw $g$ arranged therein, a nut threaded to traverse the thread of the screw and projecting through the balance-cock, a regulator-ring $d$, and a lever $f$, pivoted to the balance-cock and engaging an arm $e$ of the ring at one end and the nut at the opposite end, substantially as shown.

3. In a watch-regulator, a ring $d$, having an arm $e$, a pivoted lever $f$, having spring-jaws $j$ at one end, which grasp the arm $e$, a threaded rod or screw $g$, having a nut to traverse the same and engaging the pivoted lever, said lever having its pivoted point between its engagement with the nut and arm, substantially as shown.

4. In a watch-regulator, the combination of a lever $f$, having spring-jaws at each end and pivoted between its ends, a ring $d$, having a pointer and an arm $e$, a threaded rod or screw $g$, having a traversing nut thereon, said jaw at one end of the lever engaging the arm $e$ and the jaws at the opposite end engaging the nut, substantially as shown.

5. In a watch-regulator, a balance-cock having a threaded rod or screw arranged therein, a nut traversing said screw or rod, a lever pivoted between its ends to the balance-cock and arranged to engage the ring $d$ at one end and the nut at the opposite end, and a spring arranged to bear upon the nut and prevent lost motion, substantially as shown.

6. In a watch-regulator, the combination of a lever $f$, pivoted between its ends, a screw $g$, having a traversing nut $h$ thereon, provided with a pin $i$, the lever being arranged to engage the pin at one end and the regulator-ring at the opposite end, substantially as shown.

WM. GOLDTHWAIT.

Witnesses:
ALLEN WEBSTER,
FRANK W. LEE.